US006836057B2

(12) United States Patent
Hata

(10) Patent No.: US 6,836,057 B2
(45) Date of Patent: Dec. 28, 2004

(54) DRIVE MECHANISM EMPLOYING ELECTROMECHANICAL TRANSDUCER

(75) Inventor: Yoshiaki Hata, Ashiya (JP)

(73) Assignee: Minolta Co., Ltd., Osaka (JP)

( * ) Notice: Subject to any disclaimer, the term of this patent is extended or adjusted under 35 U.S.C. 154(b) by 18 days.

(21) Appl. No.: 09/950,796

(22) Filed: Sep. 13, 2001

(65) Prior Publication Data
US 2002/0030422 A1 Mar. 14, 2002

(30) Foreign Application Priority Data
Sep. 14, 2000 (JP) ........................................ 2000-280288

(51) Int. Cl.[7] .............................. H02N 2/00; H02N 2/04; H01L 41/04; H01L 41/08; H02L 41/06
(52) U.S. Cl. .................... 310/328; 310/300; 310/311
(58) Field of Search ................................ 310/300, 311, 310/328

(56) References Cited

U.S. PATENT DOCUMENTS

| | | | | |
|---|---|---|---|---|
| 5,523,643 A | * | 6/1996 | Fujimura et al. | 310/328 |
| 5,589,723 A | * | 12/1996 | Yoshida et al. | 310/328 |
| 5,786,654 A | * | 7/1998 | Yoshida et al. | 310/328 |
| 5,847,488 A | * | 12/1998 | Yoshida et al. | 310/328 |
| 6,111,336 A | * | 8/2000 | Yoshida et al. | 310/328 |
| 6,114,799 A | * | 9/2000 | Yoshida et al. | 310/328 |
| 6,134,057 A | * | 10/2000 | Ueyama et al. | 359/821 |
| 6,140,750 A | * | 10/2000 | Ueyama | 310/369 |
| 6,211,607 B1 | * | 4/2001 | Kanbara | 310/328 |
| 6,249,093 B1 | * | 6/2001 | Takahata et al. | 318/129 |
| 6,392,827 B1 | * | 5/2002 | Ueyama et al. | 359/824 |
| 6,424,077 B1 | * | 7/2002 | Hata et al. | 310/328 |
| 6,512,321 B2 | * | 1/2003 | Yoshida et al. | 310/316.01 |
| 6,528,926 B2 | * | 3/2003 | Okamoto et al. | 310/323.17 |
| 6,552,473 B2 | * | 4/2003 | Montuschi et al. | 310/328 |
| 6,647,753 B2 | * | 11/2003 | Engler | 70/472 |
| 6,717,329 B2 | * | 4/2004 | Yoshida et al. | 310/316.02 |
| 6,774,538 B2 | * | 8/2004 | Hata | 310/328 |

FOREIGN PATENT DOCUMENTS

JP 6-123830 5/1994
JP 7-274544 10/1995

* cited by examiner

Primary Examiner—Thomas M. Dougherty
Assistant Examiner—Pedro J. Cuevas
(74) Attorney, Agent, or Firm—McDermott Will & Emery LLP

(57) ABSTRACT

An actuator using the vibration caused by a piezoelectric element. The actuator includes: a base; a vibratory rod bonded to the base; an piezoelectric element bonded to the vibratory rod; and a contact body for contacting frictionally with the vibratory rod under an suitable frictional force exerting therebetween. The piezoelectric element is charged and discharged, so that the piezoelectric element is transformed in one direction relatively fast and in opposite direction relatively slow, and so that the contact body is driven along the vibratory rod in a set direction.

17 Claims, 10 Drawing Sheets

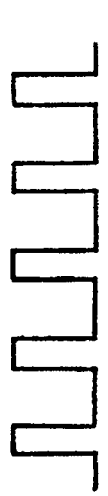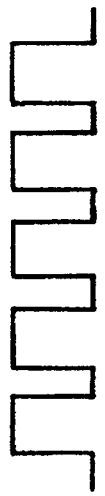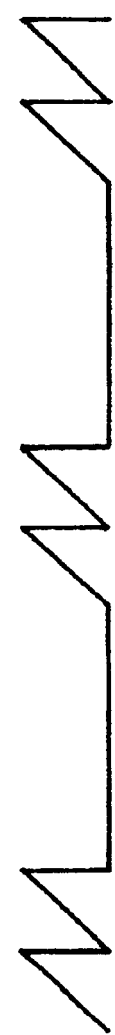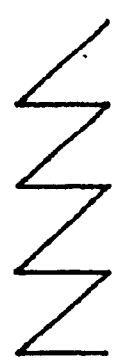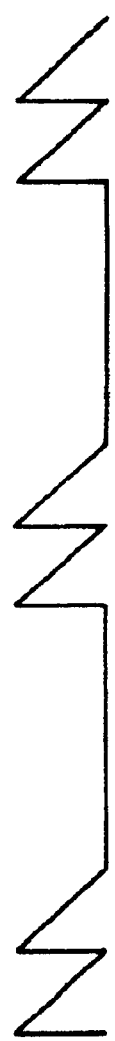
Fig.2A  Fig.2C  Fig.2E
Fig.2B  Fig.2D  Fig.2F

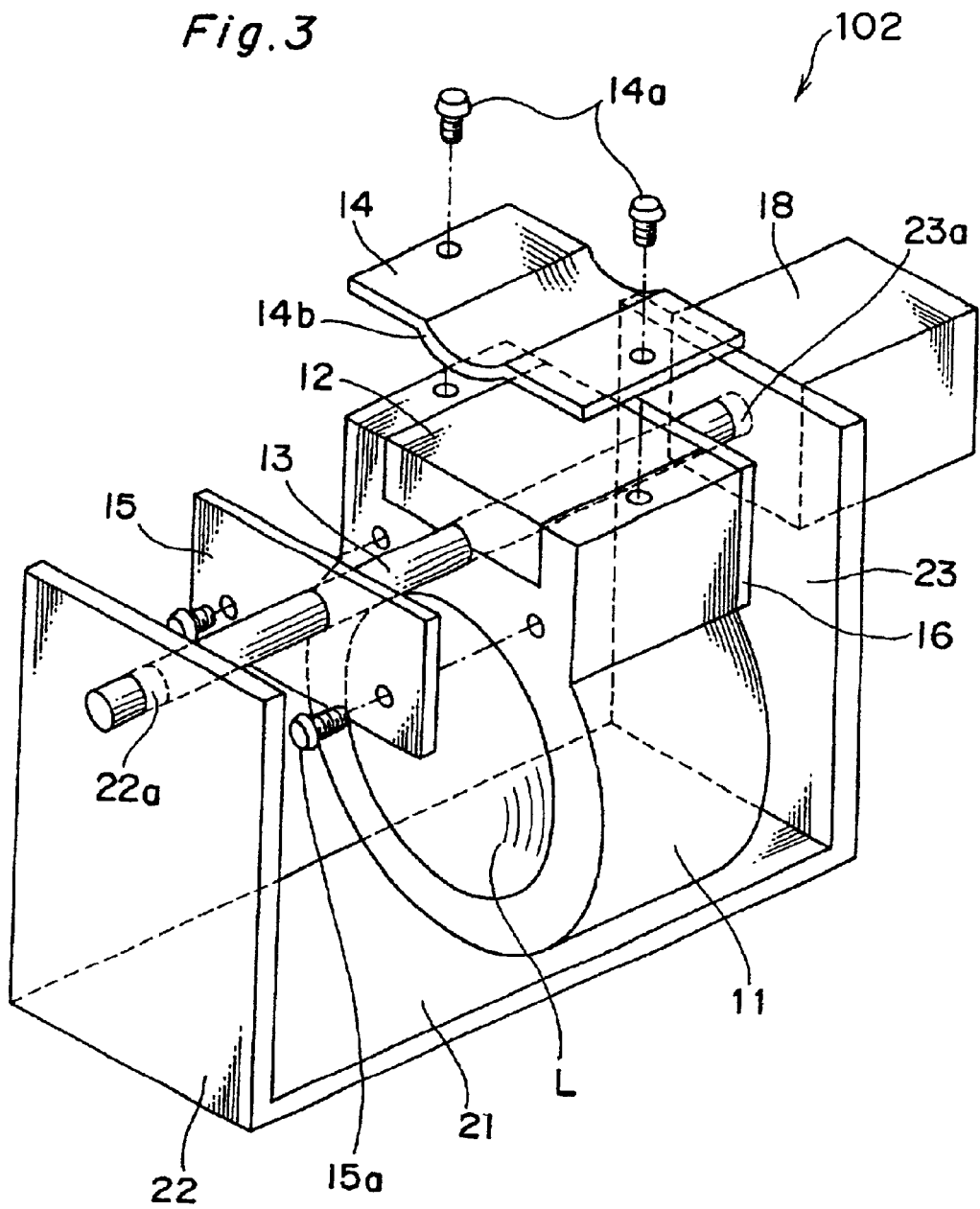

DRIVE MECHANISM EMPLOYING ELECTROMECHANICAL TRANSDUCER

This application is based upon application No. 2000-280288 filed in Japan, the contents of which are hereby incorporated by reference.

BACKGROUND OF THE INVENTION

1. Field of the Invention

The present invention relates to a drive mechanism employing an electromechanical transducer. More specifically, the present invention relates to the drive mechanism employing the electromechanical transducer or vibrating member, suitable for actuating a moving body equipped in an apparatus such as a precise device and a high-technology info tool, and for adapting a microactuator for minute operation.

2. Description of the Related Arts

Conventionally, there have been proposed some drive mechanisms employing electromechanical transducers. For example, in a drive mechanism as shown in FIG. 11, a moving body 51 contacts frictionally with a drive rod 53, which is movably supported by stationary plates 62 and 63. One end of the piezoelectric element 58 is fixed to the stationary plate 64, and its opposite end is fixed to one of the ends of the drive rod 53. In the arrangement, the piezoelectric element 18 expands at a first velocity and contracts at a second velocity, different from the first velocity, when the piezoelectric element 18 is supplied with drive pluses, for example, having a saw-teeth-shaped waveform. Thereby the drive rod 53 moves and the moving body 51 is driven along the drive rod 53 (See, for example, Japanese Non-examined Patent Publication No. 7-274544).

However, the strength of the piezoelectric element is low. Therefore, it is necessary to protect the piezoelectric element 58 from the excessive force.

Specifically, it is necessary to complicate the construction of the drive mechanism, and to limit the drive condition such as the drive velocity and the load, in order to prevent the external force from causing bending moment, torsion torque, compressive force, and tensile force to the piezoelectric element.

Additionally, it is necessary that expanding and contracting direction of the piezoelectric element 58 is precisely coincident with moving direction of the drive rod 53 moves. Therefore, it is difficult to assemble the drive mechanism, due to close tolerance of positioning the piezoelectric element 58 and drive rod 53.

Moreover, the method for fixing the piezoelectric element 58 must be chosen from methods, in which no excessive force is exerted on the piezoelectric element 58. The drive mechanism must be assembled without exerting the excessive force on the piezoelectric element 58. Thus, it is difficult to assemble the drive mechanism efficiently.

SUMMARY OF THE INVENTION

Accordingly, it is an object of the present invention to provide a drive mechanism employing an electromechanical transducer, on which no excessive force is exerted.

In order to achieve the above objects, according to one aspect of the present invention, there is provided a drive mechanism, comprising: a stationary member; a drive member fixed to the stationary member; an electromechanical transducer fixed to the drive member; and a driven member which is driven by the drive member and which contacts frictionally with the drive member under a predetermined frictional force exerting therebetween, wherein the electromechanical transducer is supplied with drive pulses, so that the electromechanical transducer expands at a first velocity and contracts at a second velocity, different from the first velocity, and so that the driven member moves along the drive member in a predetermined direction.

In the construction, the electromechanical transducer (for example, electrostatic actuator, piezoelectric transducer, electrostriction transducer, magnetostriction transducer, and so on) changes the electrical energy (for example, electric voltage, electric current, electric field, electric charge, static electricity, magnetic field) supplied thereto into the mechanical energy (for example, transformation or strain such as prolonging, compressing, expanding, contracting, bending, twisting).

In the construction, even though the principle of driving is not completely clear, the driven member can be driven relative to the drive member in a predetermined direction, by means of supplying appropriate drive pulses, for example, having a saw-teeth-shaped waveform. Such drive pulses causes the transformation of the electromechanical transducer, so that the drive member vibrates with mutually different velocities, even if the drive member is fixed to the stationary member. Namely, the vibration of the drive member includes one component at relatively slow velocity proceeding in one direction, and the other component at relatively fast velocity proceeding in opposite direction. We reason; that the one component of the vibration does not cause the relative sliding between the drive member and the driven member; that the other component of the vibration causes the relative sliding therebetween; and that by repeating such a cycle, the driven member can be driven relative to the drive member in a predetermined direction.

In the construction, the electromechanical transducer is fixed to (or restrained by) only the drive member, and thereby, no excessive force is exerted on the electromechanical transducer.

As an embodiment, expansion and contraction of the electromechanical transducer makes the drive member vibrate, so that a cycle of the vibration of the drive member causes one state in which the driven member slides along (or is slidable along) the drive member in a predetermined direction, resisting the frictional force exerting therebetween, and another state in which the driven member does not slide along (or is unslidable along, or remains stationary against) the drive member with the frictional force exerting therebetween.

As an embodiment, the drive member has a pair of ends, so that a portion near one of the ends of the drive member is fixed to the stationary member, and so that the electromechanical transducer is fixed to the other of the ends of the drive member.

According to the embodiment, it is possible to prevent the drive member from moving, and to have a driving range of the driven member along the drive member between one positions fixed to the stationary member and the other position fixed to the electromechanical transducer, without any stopper for preventing the driven member from moving beyond the driving range.

As an embodiment, the drive member has a pair of ends, so that a portion near one of the ends of the drive member is fixed to the stationary member, and so that the electromechanical transducer is fixed to the one of the ends of the drive member.

According to the embodiment, it is possible to increases the space around the driven member.

As an embodiment, another portion near the other of the ends of the drive member is supported by the stationary member.

According to the embodiment, it is possible to prevent the drive member from moving, and to have a driving range of the driven member along the drive member between one position fixed to the stationary member and the other position supported by the stationary member, without any stopper for preventing the driven member from moving beyond the driving range.

As an embodiment, another portion near the other of the ends of the drive member is fixed to the stationary member.

According to the embodiment, it is possible to prevent the drive member from moving, and to have a driving range of the driven member along the drive member between two positions fixed to the stationary member, without any stopper for preventing the driven member from moving beyond the driving range.

As an embodiment, the stationary member is fixed to a lens barrel, and wherein the driven member holds a lens.

As an embodiment, the drive member is fixed to the stationary member by one of caulking, press fitting, fusion bonding, adhesive bonding, screw fastening, and welding.

As an embodiment, the drive member is formed with elastic material.

In order to achieve the above object, according to another aspect of the present invention, there is provided a drive mechanism, comprising: a stationary member; a drive member, having a pair of ends, fixed to the stationary member; a first electromechanical transducer fixed to one of the ends of the drive member; a second electromechanical transducer fixed to the other of the ends of the drive member; and a driven member which is driven by the drive member and which contacts frictionally with the drive member under a predetermined frictional force exerting therebetween, wherein at least one of the first electromechanical transducer and the second electromechanical transducer is supplied with drive pulses, so that the at least one thereof expands at a first velocity and contracts at a second velocity, different from the first velocity, and so that the driven member moves along the drive member in a predetermined direction.

In the construction, the electromechanical transducers are fixed to (or strained by) only both ends of the drive member, and thereby, no excessive force is exerted on the electromechanical transducers.

Moreover, in the construction, it is possible to drive the driven member identically in one direction and opposite direction, for example, by supplying same drive pulses to either one of the electromechanical transducers selectively.

As an embodiment, expansion and contraction of the at least one of the first electromechanical transducer and the second electromechanical transducer makes the drive member vibrate, so that a cycle of the vibration of the drive member causes one state in which the driven member slides along (or is slidable along) the drive member in a predetermined direction, resisting the frictional force exerting therebetween, and another state in which the driven member does not slide along (or is unslidable along, or remains stationary against) the drive member with the frictional force exerting therebetween.

As an embodiment, a portion near the one of the ends of the drive member and another portion near the other of the ends thereof are fixed to the stationary member.

According to the embodiment, it is possible to prevent the drive member from moving, and to have a driving range of the driven member along the drive member between two positions fixed to the stationary member, without any stopper for preventing the driven member from moving beyond the driving range.

As an embodiment, the stationary member is fixed to a lens barrel, and wherein the driven member holds a lens.

As an embodiment, the drive member is fixed to the stationary member by one of caulking, press fitting, fusion bonding, adhesive bonding, screw fastening, and welding.

As an embodiment, the drive member is formed with elastic material.

In order to achieve the above object, according to still another aspect of the present invention, there is provided a drive mechanism, comprising: a first member; a second member for contacting frictionally with the first member under a predetermined frictional force exerting therebetween; and an electromechanical transducer fixed to the first member, wherein the electromechanical transducer is supplied with drive pulses, so that the electromechanical transducer expands at a first velocity and contracts at a second velocity, different from the first velocity, and so that one of the first member and the second member moves relative to the other thereof in a predetermined direction.

In the construction, the electromechanical transducer vibrates the first member with mutually different velocities. Namely, the vibration of the first member includes one component at relatively slow velocity proceeding in one direction, and the other component at relatively fast velocity proceeding in opposite direction. The one component of the vibration does not cause the relative sliding between the first member and the second member. On the other hand, the other component of the vibration causes the relative sliding therebetween. By repeating such a cycle, in case that one of the first member and the second member is fixed to the stationary member, the other thereof is driven relative to the one thereof in a predetermined direction.

In the construction, the electromechanical transducer is restrained by only the first member, and thereby, it is possible to exert no excessive force on the electromechanical transducer.

As an embodiment, expansion and contraction of the electromechanical transducer makes the first member vibrate, so that a cycle of the vibration of the first member causes one state in which the one of the first member and the second member moves along (or is movable along) the other thereof in a predetermined direction, resisting the frictional force exerting therebetween, and another state in which the one thereof does not move along (or is unmovable along, or remains stationary against) the other thereof with the frictional force exerting therebetween.

In order to achieve the above object, according to still another aspect of the present invention, there is provided a drive mechanism, comprising: a stationary member; a first drive member fixed to the stationary member; a first electromechanical transducer fixed to the fist drive member; a first driven member which is driven by the first drive member and which contacts frictionally with the first drive member under a predetermined frictional force exerting therebetween; a second drive member fixed to the first driven member; a second electromechanical transducer fixed to the second drive member; a second driven member which is driven by the second drive member and which contacts frictionally with the second drive member under a predetermined frictional force exerting therebetween; a third drive member fixed to the second driven member; a third electromechanical transducer fixed to the third drive member; a third driven member which is driven by the third drive member and which contacts frictionally with the third drive member under a predetermined frictional force exerting therebetween, wherein each of the first electromechanical transducer, the second electromechanical transducer, and the third electromechanical transducer is supplied with drive pulses, so that each thereof expands at a first velocity and contracts at a second velocity, different from the first velocity, respectively, and so that each of the first driven member, the second driven member, and the third driven member moves relative to each of the first drive member, the second drive member, and the third drive member in a predetermined direction, respectively.

In the construction, the third driven member can be driven at three or more degrees of freedom in three-dimensional space.

As an embodiment, expansion and contraction of each of the first electromechanical transducer, the second electromechanical transducer, and the third electromechanical makes each of the first drive member, the second drive member, and the third drive member vibrate respectively, so that a cycle of the vibration of each thereof causes one state in which each of the first driven member, the second driven member, and the third driven member moves along (or is movable along) each of the first drive member, the second drive member, and the third drive member in a predetermined direction, resisting the frictional force exerting therebetween, respectively, and another state in which each of the first driven member, the second driven member, and the third driven member does not move along (or is unmovable along, or remains stationary against) each of the first drive member, the second drive member, and the third drive member with the frictional force exerting therebetween, respectively.

As an embodiment, the first drive member, the second drive member, and the third drive member are arranged, so that the moving directions of the first driven member, the second driven member, and the third driven member are substantially perpendicular to each other.

In the construction, the vibration in one of the driven members exerts no influence on the other thereof, and therefore the drive mechanism can be driven efficiently.

BRIEF DESCRIPTION OF THE DRAWINGS

This and other objects and features of the present invention will become clear from the following description taken in conjunction with the preferred embodiments thereof with reference to the accompanying the drawings.

FIGS. 2A through 2F are waveform charts of drive pulses supplied to the piezoelectric element in the drive mechanism as shown in FIG. 1.

FIG. 3 is a schematic exploded view of a drive mechanism according to a second embodiment of the present invention.

DETAILED DESCRIPTION OF THE PREFERRED EMBODIMENTS

Figure 1:
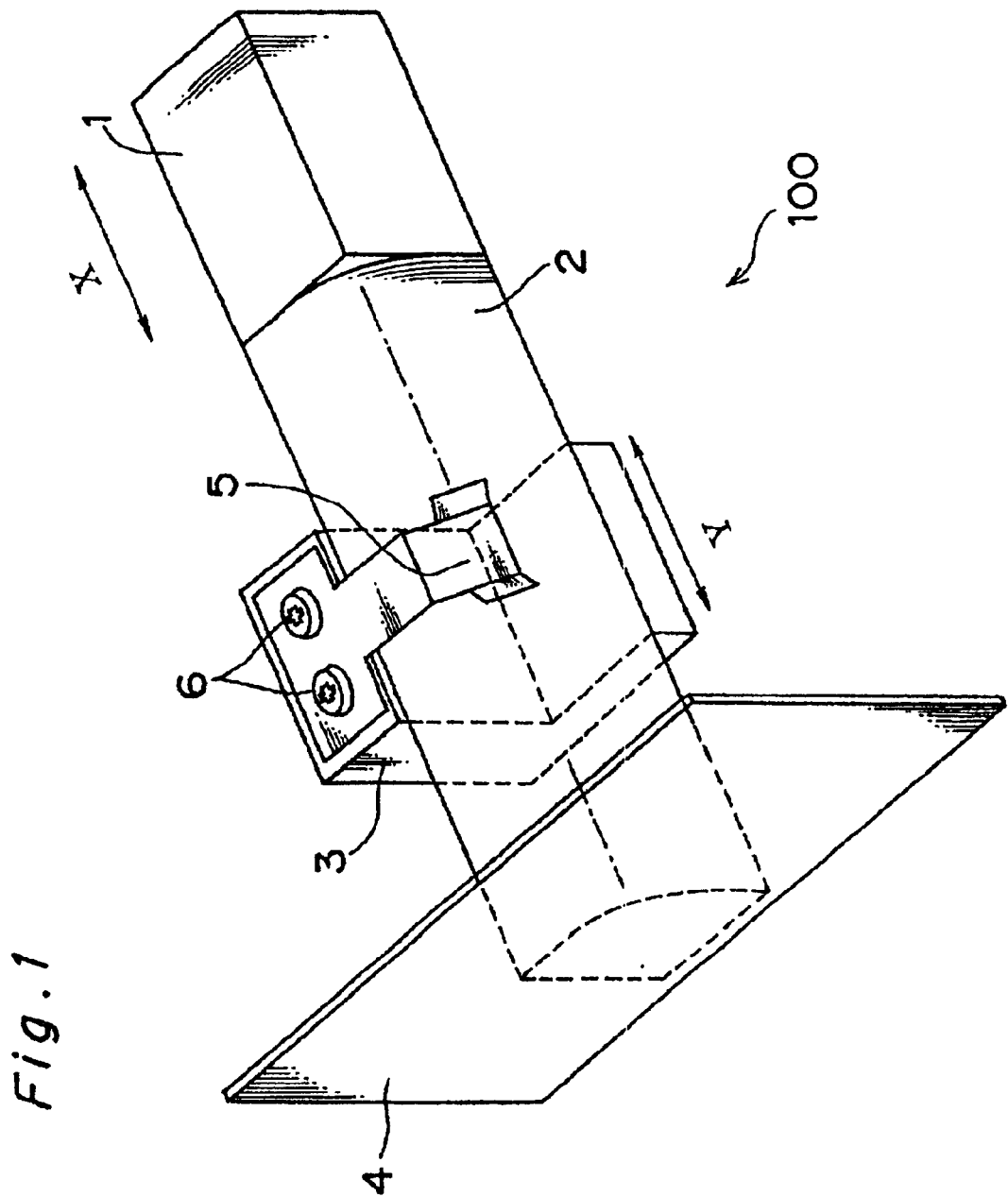
FIG. 1 is a perspective view of a drive mechanism according to a first embodiment of the present invention.

Before the description of each of the preferred embodiments according to the present invention proceeds, it is to be noted that like or corresponding parts are designated by like reference numerals throughout the accompanying drawings.

A detailed description is made below upon drive mechanisms of the preferred embodiments, with reference to FIG. 1 through FIG. 10.

First, referring to FIGS. 1 and 2, the description is made below in detail on a drive mechanism, according to a first embodiment of the present invention. FIG. 1 is a perspective view showing a construction of the drive mechanism 100. The drive mechanism 100 comprises a piezoelectric element 1, a drive rod 2, a contact body 3, and a stationary member 4. Each of the piezoelectric element 1 and the drive rod 2 has a pair of ends. One end of the drive rod 2 is adhered to one end of the piezoelectric element 1. The opposite end of the drive rod 2 is fixed to the stationary member 4. The contact body 3 frictionally contacts with the drive rod 2.

Specifically, the drive rod 2 has an approximately prismatic shape. The contact body 3 has an L-shape section, extending along two planes crossing at a sharp corner of the drive rod 2, so as to slidably contact with the drive rod 2 without rotating respect to the drive rod 2. The contact body 3 can move along the drive rod 2 longitudinally. An urging spring 5 is fixed to the contact body 3 by bolts 6. The urging spring 5 contacts with a round corner of the drive rod 2, opposite to the sharp corner thereof, so that the contact body 3 contacts frictionally with the drive rod 2 under an appropriate frictional force exerting therebetween.

A principle of operation of the driven mechanism 100 is supposed as follows. The piezoelectric element 1 repeats expanding and contracting in directions indicated by an arrow X in FIG. 1, responding to appropriate drive pulses supplied thereto, and thus vibrates. Such vibration of the piezoelectric element 1 is transmitted to the drive rod 2, and makes the drive member 2 vibrate. Then, the contact body 3 moves in either one of directions indicated by an arrow Y in FIG. 1. The direction and the velocity of motion of the contact body 3 can be controlled by means of changing drive pulses supplied to the piezoelectric element 1.

Specifically, when drive pulses (or pules voltage), for example, having a generally saw-teeth-shaped waveform with pairs of a slowly raising portion and a rapidly falling portion as shown in FIG. 2A, is supplied (or applied) to the piezoelectric element 1, the piezoelectric element 1 repeats expanding slowly in one of both directions indicated by the arrow X in FIG. 1, and contracting rapidly in the other thereof, in a same cycle as that of drive pulses. Such vibration of the piezoelectric element 1 causes the drive rod 2 to vibrate.

The drive rod 2 vibrates at least in its longitudinal directions with mutually different velocities. That is to say, the waveform of such a vibration is not symmetric about an axis parallel to a time axis. The contact body 3 slides or moves along the drive rod 2 in either one of directions shown by the arrow Y in FIG. 1.

It is possible to move the contact body 3 in opposite direction by changing drive pulses supplied to the piezoelectric element 1. For example, a generally saw-teeth-shaped waveform, having pairs of a rapidly raising portion and a slowly falling portion, as shown in FIG. 2B are supplied to the piezoelectric element 1.

Drive pulses, having square waveforms as shown in FIGS. 2C and 2D, may be supplied to the piezoelectric element 1. It is possible to change the moving direction of moving the contact body 3, by changing the duty of square waves.

In case that drive pulses have saw-teeth waveforms or square waveforms, it is possible to change the moving direction of the contact body 3 by means of changing the period of drive pulses without changing the type of waveforms. Drive pulses are rot limited to saw-teeth waveforms or square waveforms, but it may be any waveforms so as to vibrate the drive rod 3 with mutually different velocities.

Furthermore, it is possible to move the contact body 3 by a small amount, when drive pulses, having intermittent waveforms as shown in FIGS. 2E and 2F, are supplied to the piezoelectric element 1.

As shown in the above described embodiment, only one end of the piezoelectric element 1 is adhered to the drive rod 2, and thus, the number of portions where the piezoelectric element 1 is strained is reduced to one. Since the mechanical strength of the drive rod 2 can be high and the drive rod 2 does not: need to be able to move longitudinally, the drive rod 2 can be fixed firmly to the stationary member 4. Therefore, it is possible to simplify the construction of the drive mechanism 100, without conventional urging or holding member for removing the play of the drive rod relative to the supporting portion therefor.

Moreover, since the piezoelectric element 1 is blocked from the external force and the working load, no excessive force is exerted on the piezoelectric element 1, and thereby, it is possible to make the drive mechanism 100 strong and rigid. Specifically, although, in the conventional drive mechanism, there is a problem about peeling at the boundaries adhered between the piezoelectric element and the stationary member and between the piezoelectric element and the drive rod, such a problem is not caused in the drive mechanism 100.

Furthermore, since at least one portion of the drive rod 2 may be fixed on the stationary member 4 and at least another portion of the drive rod 2 may be adhered to the piezoelectric element 1, it is easy to assemble the drive mechanism 100. Since the mechanical strength of the drive rod 2 can be high, as described above, the way having easy operations can be selected, in order to fix the drive rod 2 to the stationary member 4. Moreover, since it is sufficient that the adhesive strength between the piezoelectric element 1 and the drive rod 2 is so strong as to prevent the piezoelectric element 1 from peeling from the drive rod 2 during the operation, the way having easy operations can be selected, in order to fix the piezoelectric element 1 to the drive rod 2. Thus, the drive mechanism 100 can be assembled more easily.

In one specific example of the embodiment, the piezoelectric element 1 is a rectangular solid, having a height and a depth of 3 mm each and a width of 5 mm.

In the above example, the drive rod 2 is formed with fiberglass reinforced plastic, including 50 weight percent carbon fiber. The drive rod 2 is generally rectangular solid, which section is generally square 3.5 mm on a side, and which length is 20 mm. One of corners of the section is rounded by 3.5 mm. Young's modulus of the drive rod 2 is nearly 0.6 time as many as that of the metal (steel). The drive rod 2 is as heavy as the piezoelectric element 1. Alternatively, any material other than fiberglass reinforced plastic can be used for the drive rod 2, if Young's modulus and density thereof fall in the range in which the power of the piezoelectric element 1 can cause appropriate longitudinal vibration in the drive rod 2.

In case that drive pulses, which frequency is nearly similar to natural frequency in a cantilever model about the drive mechanism 100, are supplied to the piezoelectric element 1, it is possible to actuate the contact body 3 efficiently. In the cantilever model, one end of a cantilever, corresponding to the drive rod 2, is fixed (or build-in) and the other end thereof has the mass, corresponding to the piezoelectric element 1. In the above example, especially efficient frequency of drive pulses fell in the range generally between 130 kHz and 150 kHz. The frequency of drive pulses is not limited to the range near the natural frequency of longitudinal vibration, but may be the range near the frequency causing high frequency resonance or subharmonic resonance, or may be the frequency forcing the vibration irrelevant to the harmonic resonance.

Next, referring to FIG. 3, a description is made below in detail on a drive mechanism, according to a second embodiment of the present invention. The drive mechanism 102, as shown in FIG. 3, is used for moving a lens L. The lens frame 11 for holding the lens L contacts frictionally with a drive rod 13 by means of a frictional plate 12. Specifically, the frictional plate 12 is urged toward the lens frame 11 by a curved portion 14b of an urging spring 14. The urging spring 14 is fixed to the lens frame 11 by bolts 14a. Holding plates 15 and 16, fixed to the lens frame 11 by bolts 15a, prevent the frictional plate 12 from removing from the lens frame 11.

The drive rod 13 penetrates between the lens frame 11 and the friction plate 12, and is pressed therebetween by the urging spring 14. Thus, the drive rod 13 contacts with the lens frame 11 and the frictional plate 12 under an appropriate frictional force exerting contact surfaces thereof.

A stationary member 21 has holding plates 22 and 23. The drive rod 13 penetrates through a small opening 23a of one of the holding plate 23 and is fixed thereto. Such a fixation may be performed by means of adhesive bonding, press fitting, fusion bonding, and so on. The piezoelectric element 18 is fixed to the one end of the drive rod 13 outside of the holding plate 23. Such fixing may be performed by means of adhesive bonding, press fitting, and so on. Although there is a small clearance between the piezoelectric element 18 and the holding plate 23, the piezoelectric element 18 may be contacted with the holding plate 23, or may be fixed to the holding plate 23 by means of adhesive and the like. The other end of the drive rod 13 loosely fits within a small hole 22a of the other of the holding plate 22, due to easy assembling. Alternatively, the drive rod 13 may tightly fits within the small hole 22a or fixed thereto.

In the drive mechanism 102, for example, supplying drive pulses as shown in FIGS. 2A–2F to the piezoelectric element 18 causes the piezoelectric element 18 to vibrate. Such a vibration seems to make the drive rod 13 vibrate at least longitudinally. Therefore, the lens frame 11 moves along the drive rod 13. The moving direction of the lens frame 11 may be controlled by changing the waveform of drive pulses.

Since the piezoelectric element 18 is connected with only the drive rod 13 in the drive mechanism 102, the external forces, such as bending moment and so on, exerting to the piezoelectric element 18 are reduced widely, so as to limit to the weight of the piezoelectric element 18 and the force exerted by the wires connected to the piezoelectric element 18. Thus, the mechanical strength of the drive mechanism 102 can be improved without any members for reinforcing the piezoelectric element 18.

Figure 4:
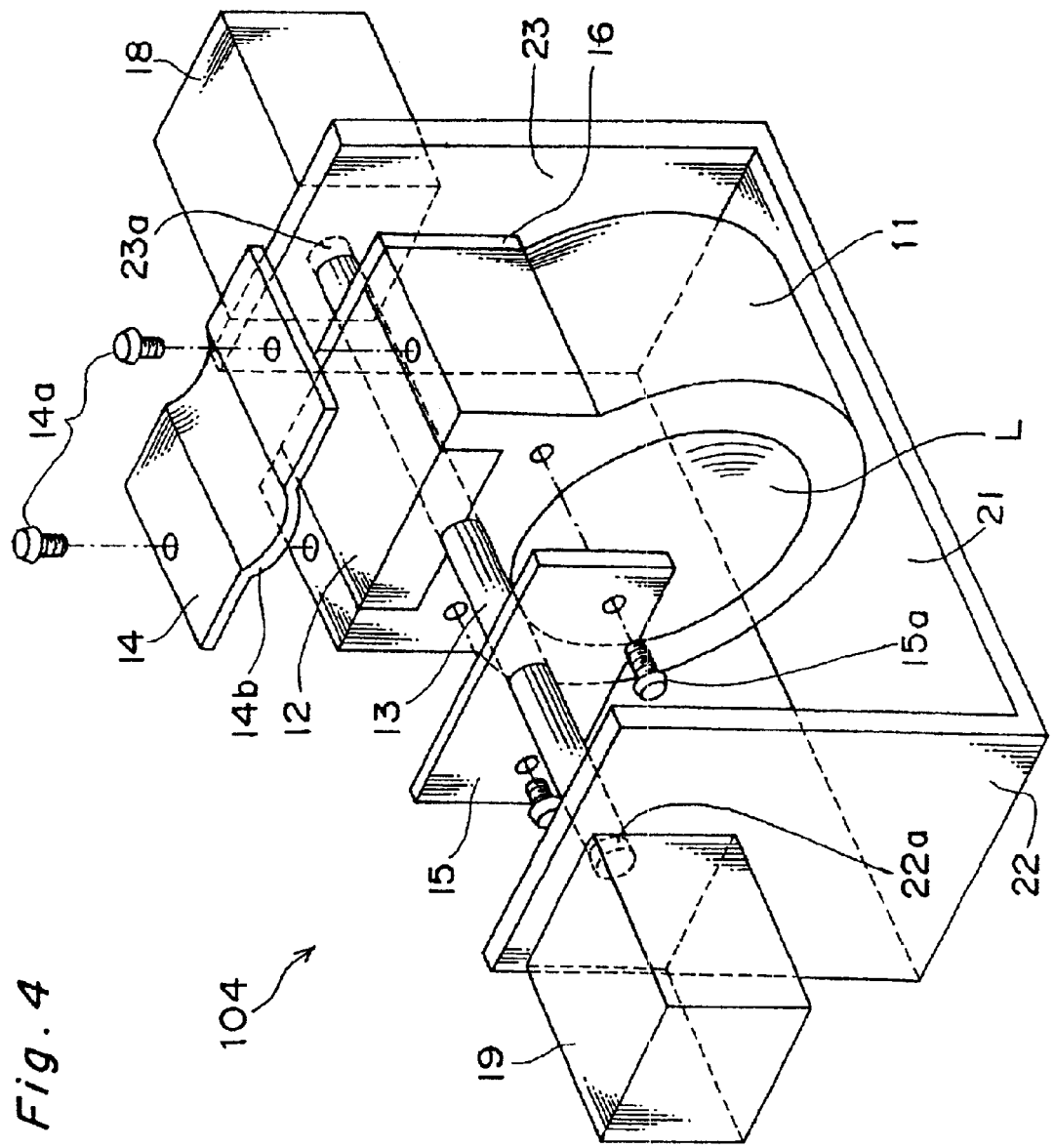
FIG. 4 is a schematic exploded view of a drive mechanism according to a third embodiment of the present invention.

Next, referring to FIG. 4, a description is made below in detail on a drive mechanism, according to a third embodiment of the present invention. The drive mechanism 104 as shown in FIG. 4 is generally similar to the drive mechanism 102 as shown in FIG. 3. It is, however, different from the drive mechanism 102 as shown in FIG. 3, that another piezoelectric element 19 is connected with the other end of the drive rod 13, that the drive rod 13 is fixed to the small opening 23a of the holding plate 23, and that there is a small clearance between the piezoelectric element 19 and the holding plate 22 as well as that between the piezoelectric element 18 and the holding plate 23.

In the drive mechanism 104, for example, supplying drive pulses, as shown in FIGS. 2A–2F, to both of the piezoelectric elements 18 and 19 at one time, or to either one thereof selectively, causes the vibration of the piezoelectric elements 18 and/or 19. Such vibration is transmitted to the drive rod 13, and then the lens frame 11 moves. Since the piezoelectric elements 18 and 19 are arranged at both ends of the drive rod 13, the moving direction of the zooming lens frame 11 can be changed by supplying drive pulses to whether one of the piezoelectric elements 18 and 19. Thus, the moving amounts and the moving velocities of the lens frame 11 in one direction and in opposite direction can be controlled similarly or symmetrically, by selecting either one of the piezoelectric elements 18 and 19 for supplying drive pulses thereto. Moreover, it is possible to drive the lens frame 11 in both directions, by supplying the same drive pulses to either one of the piezoelectric elements 18 and 19. Thus, the circuit for generating drive pulses can be simplified, without providing different circuits for each moving direction of the lens frame 11.

Furthermore, in case of supplying the drive pulses to both of the piezoelectric elements 18 and 19, it is possible to improve the performance of the moving velocity, the driving force, the resolution of movement, and so on, by means of adjusting respective timing to supply drive pulses to the piezoelectric elements 18 and 19, combining different drive pulses for respective piezoelectric elements 18 and 19, and so on.

Figure 5:
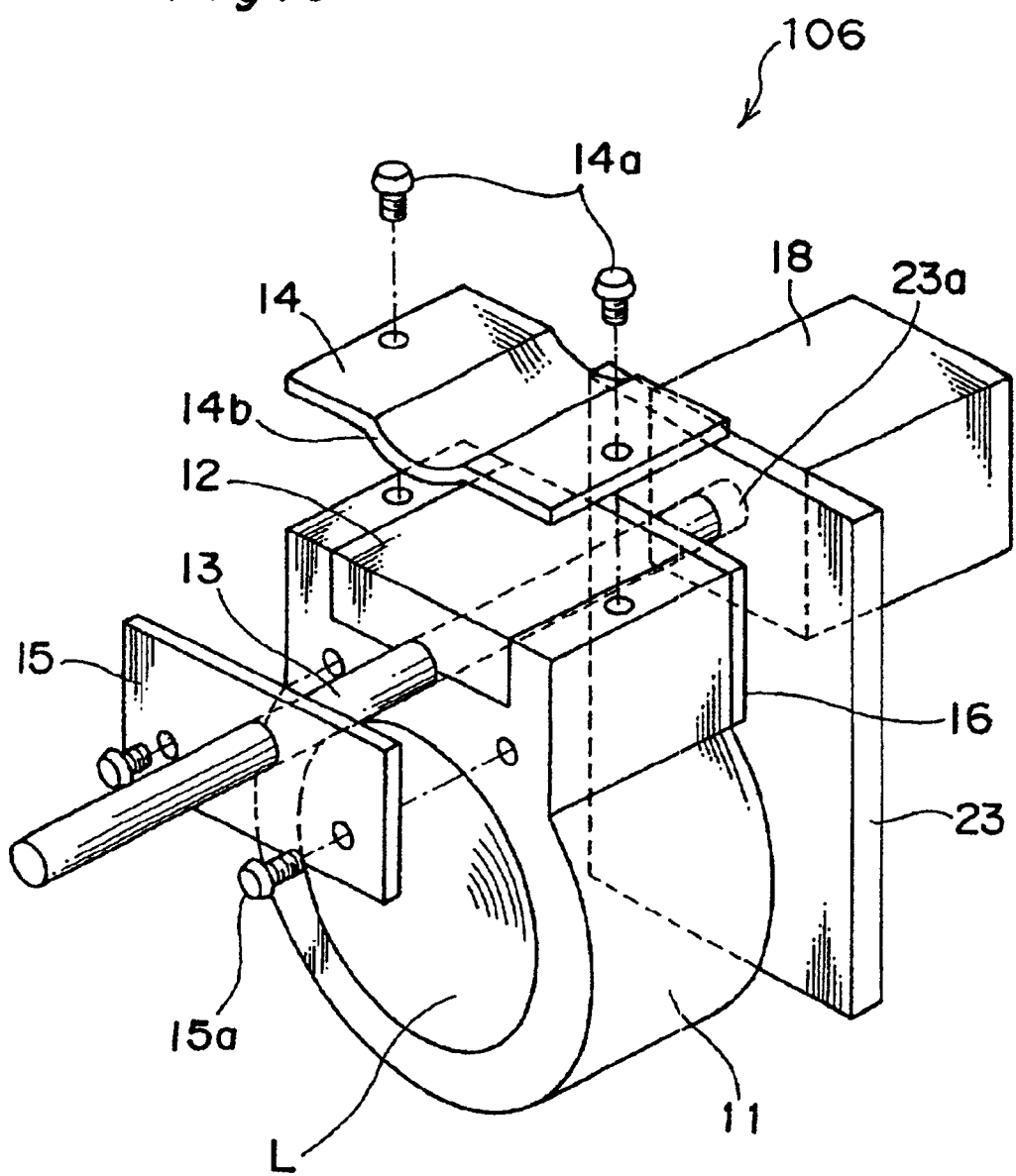
FIG. 5 is a schematic exploded view of a drive mechanism according to a fourth embodiment of the present invention.

Next, referring to FIG. 5, a description is made below in detail on a drive mechanism 106, according to a fourth embodiment of the present invention. The drive mechanism 106 as shown in FIG. 5 is generally similar to the drive mechanism 102 as shown in FIG. 3. It is, however, different from the drive mechanism 102 in FIG. 3 that only one end of the drive rod 13 is fixed to the hole 23a of the holding plate 23, and the other end thereof is not supported or fixed. Since the other end of the drive rod 13 is a free end, it is possible to make the construction of the drive mechanism 106 small and light. Such construction is suitable for driving extremely light loading, for example, a small lens, and a micro lens.

Figure 6:
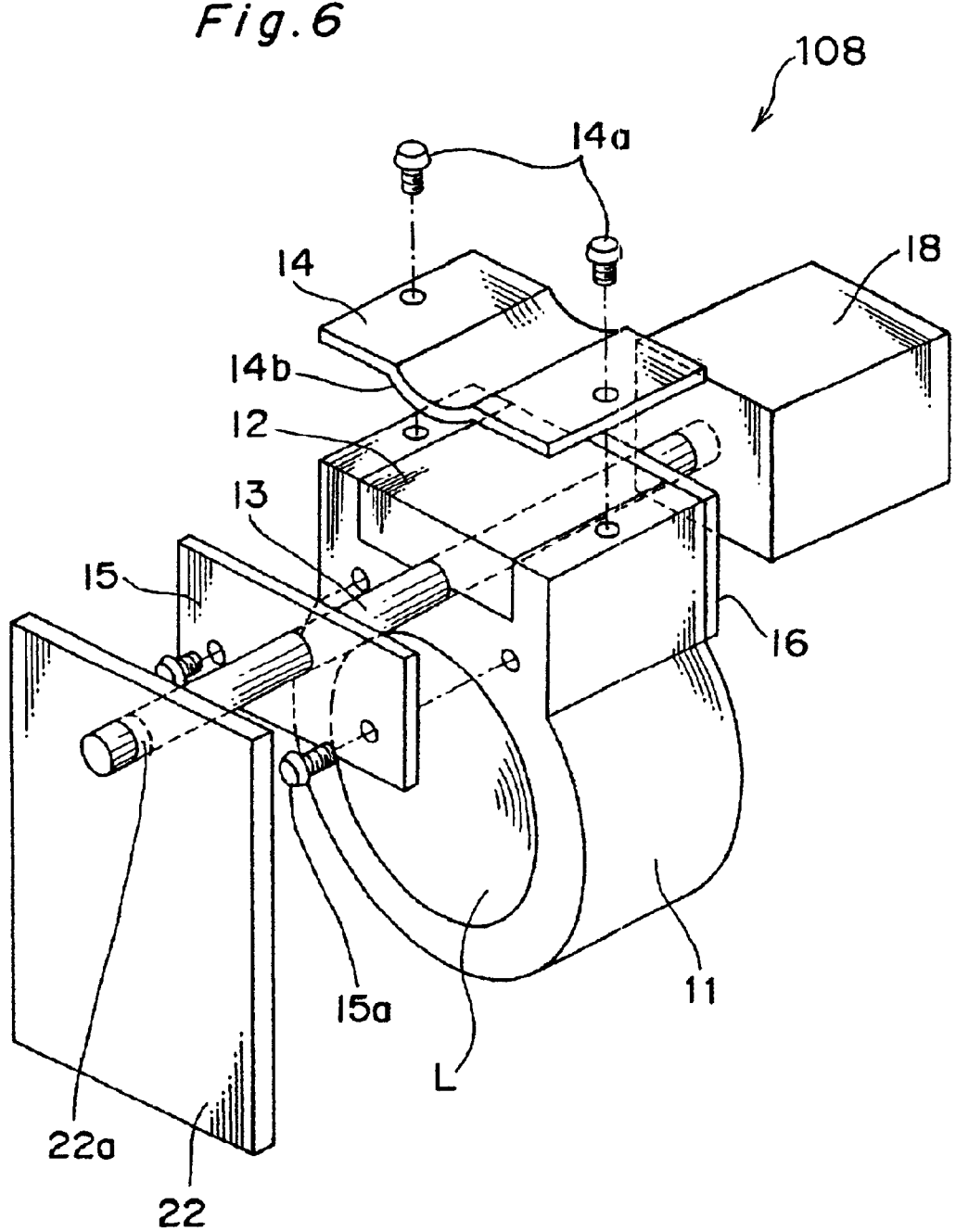
FIG. 6 is a schematic exploded view of a drive mechanism according to a fifth embodiment of the present invention.

Next, referring to FIG. 6, a description is made below in detail on a drive mechanism 108, according to a fifth embodiment of the present invention. The drive mechanism 108 as shown in FIG. 6 is generally similar to the drive mechanism 102 in FIG. 3. It is, however, different from the drive mechanism 102 in FIG. 3 that one end of the drive rod 13 is not fixed or supported, and only the other end thereof is fixed to the hole 22a of the holding plate 22. Since the one end of the drive rod 13 is a free end, it is possible to make the construction of the drive mechanism 108 small and light. Such a construction is suitable for driving extremely light loading, for example, a small lens, and a micro lens. Additionally, another piezoelectric element may be bonded to the other end of the drive rod 13, similar to the drive mechanism 104 of the third embodiment.

Figure 7:
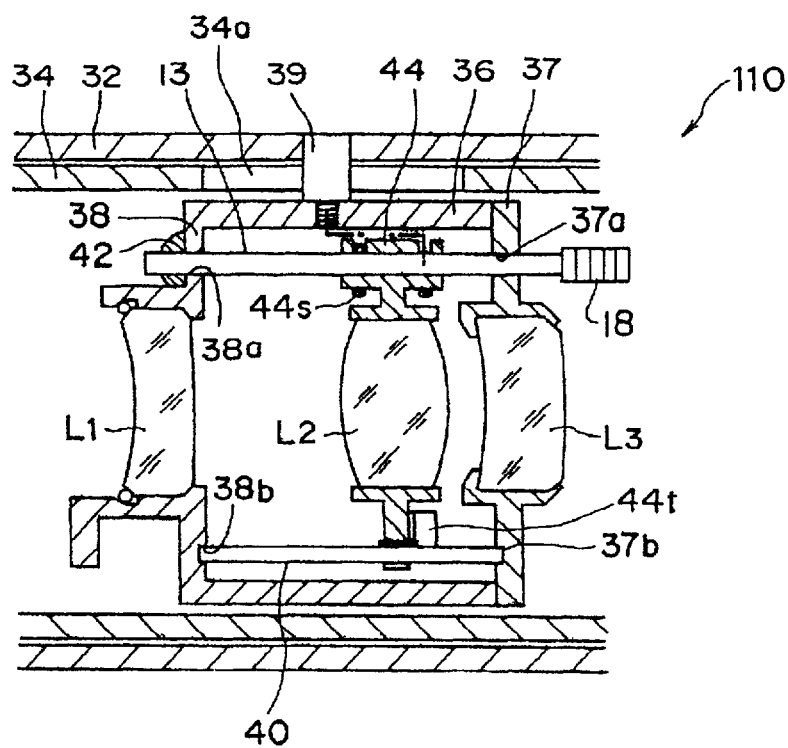
FIG. 7 is a sectional perspective view of main part of a drive mechanism according to a sixth embodiment of the present invention.

Next, referring to FIG. 7, a description is made below in detail on a drive mechanism 110, according to a sixth embodiment of the present invention. The drive mechanism 110 is used for moving a second lens L2 relative to a first lens L1 and a third lens L3. The lenses L1, L2, and L3 are held by a holding member 36. The holding member 36 has a cam follower pin 39, which engages both a cam groove of a driving barrel 32 and a straight groove of a stationary barrel 34 so as to drive the holding member 36 in a direction of optical axis by the relative rotation of the driving barrel 32 and the stationary barrel 34. A first lens frame 38 for holding the first lens L1 and a third lens frame 37 for holding the third lens L3 are fixed to the lens holding member 36. A second lens frame 44 for holding the second lens L2 is slidably held by the drive rod 2 and a guide rod 40. One end of the drive rod 2 penetrates a hole 38a of the first lens frame 38 and fixed to the first lens frame 38 by the adhere 42. The other of the drive rod 13 penetrates a hole 37a of the third lens frame 37, and is adhered to one end of the piezoelectric element 18 in expanding and contracting directions.

Alternatively, the piezoelectric element 18 may be adhered to the one end of the drive rod 13, or a pair of piezoelectric elements may be adhered to both ends thereof. One end of the guide rod 40 is fixed to the hole 38b of the first lens frame 38, and the other end thereof is fixed to the hole 37b of the third lens frame 37. The second lens frame 44 contacts frictionally with the drive rod 13 and without play, by means of urging springs 44s, 44e. Supplying the appropriate drive pulses to the piezoelectric element 18 causes the vibration of the piezoelectric element 18, which vibrates the drive rod 13 longitudinally so as to move the second lens frame 44 along the drive rod 13.

Figure 8:
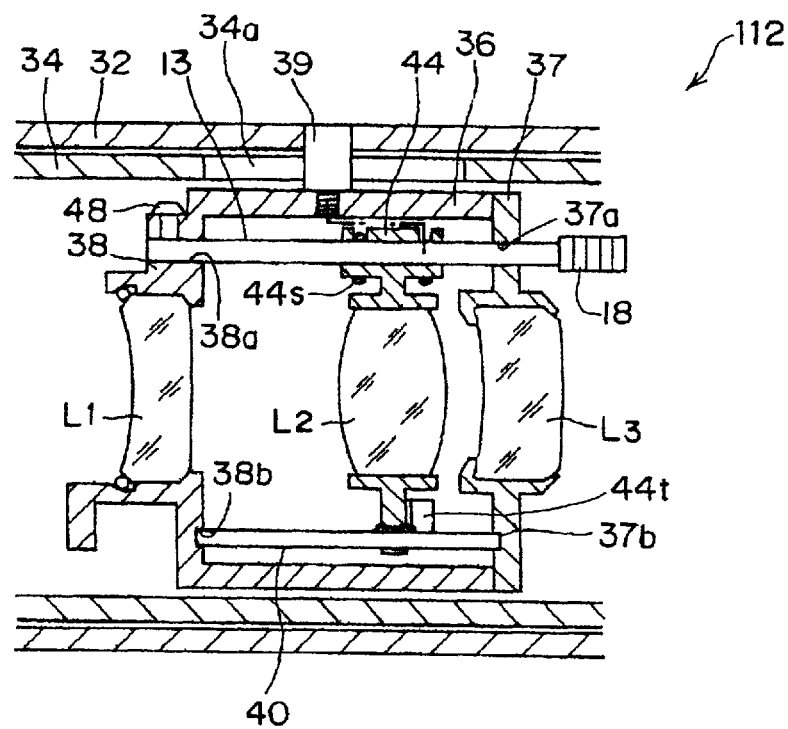
FIG. 8 is a sectional view of main part of a drive mechanism according to a seventh embodiment of the present invention.

Next, referring to FIG. 8, a description is made below in detail on a drive mechanism 112, according to a seventh embodiment of the present invention. The drive mechanism 112 as shown in FIG. 8 is generally similar to the drive mechanism 110 as shown in FIG. 7. It is, however, deferent from the drive mechanism 110 in FIG. 7 that the one end of the drive rod 13 is fixed to the first lens frame 38, not by adhesive 42, but by a bolt 48.

In the above described drive mechanism 112, at least one position of the drive rod 13 may be fixed, and the piezoelectric element 18 may be connected to only the drive rod 13. Thus, it is easy to assemble the drive mechanisms. Moreove, since the mechanical strength of the drive rod 13 is high, it is possible to choose any efficient method for fixing the drive rod 13, such as caulking, press fitting, fusion bonding, adhesive bonding, screw fastening, welding.

Figure 9:
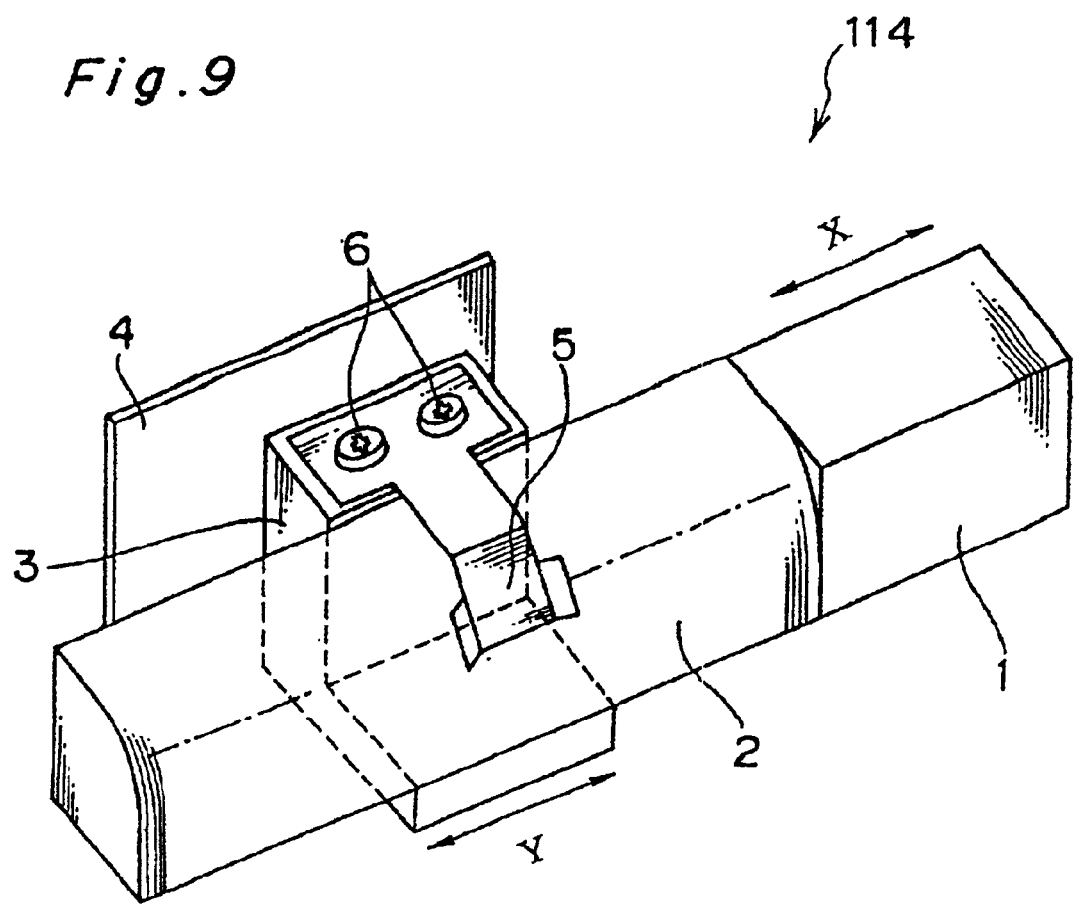
FIG. 9 is a perspective view of a drive mechanism according to a eighth embodiment of the present invention.

Next, referring to FIG. 9, a description is made below in detail on a mechanism 114, according to a eighth embodiment of the present invention. The drive mechanism 114 as shown in FIG. 9 is generally similar to the drive mechanism 100 as shown in FIG. 1. It is, however, different from the drive mechanism 100 in FIG. 1 that not the drive rod 2, but the contact body 3 is fixed to the stationery member 4.

The vibration of the piezoelectric element 1 in directions indicated by an arrow X, caused by supplying appropriate drive pulses, causes longitudinal vibration, having asymmetric waveform respective to time axis direction, of the drive rod 2. Since the contact body 3 is fixed to the stationary 4, it is possible to move the drive rod 2 together with the piezoelectric element 1, in either one of both directions indicated by an arrow Y. It is possible to move the drive rod 2 together with the piezoelectric element 1 in opposite direction, by means of changing the drive pulses.

Figure 10:
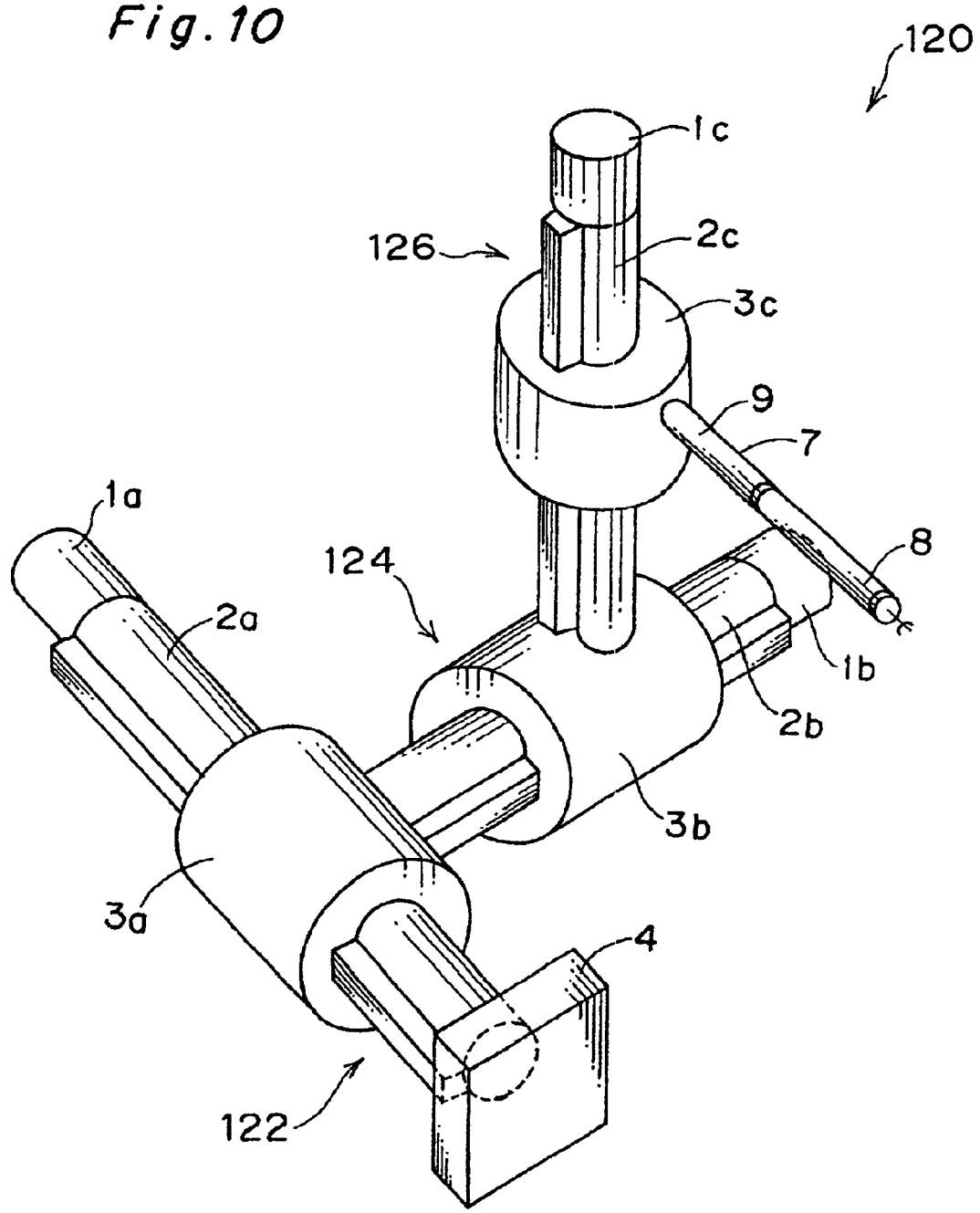
FIG. 10 is a perspective view of a manipulator according to a ninth embodiment of the present invention.
Figure 11:
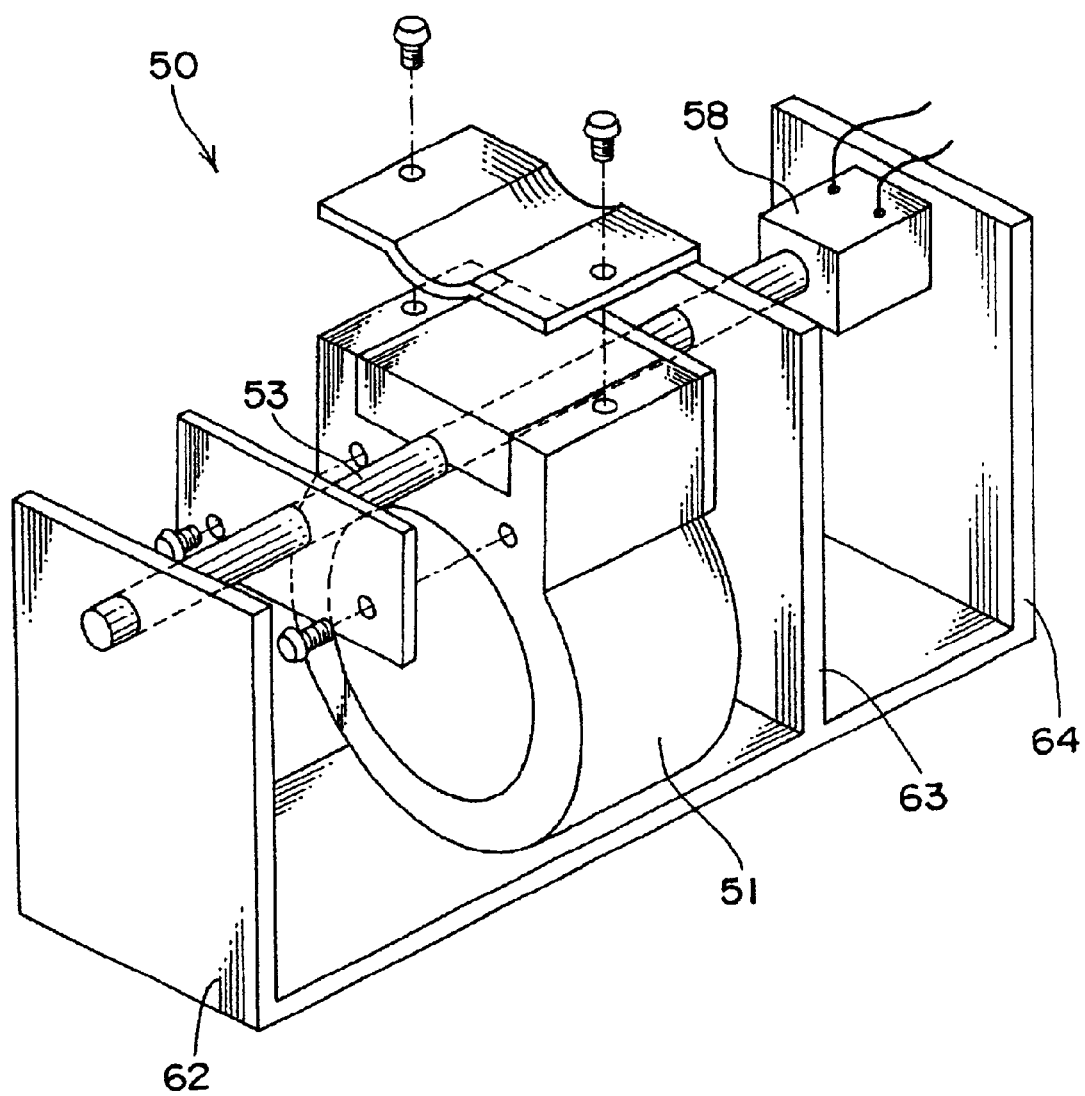
FIG. 11 is an exploded perspective view of a conventional drive mechanism using a piezoelectric element 18.

Next, referring to FIG. 10, a description is made below in detail on a manipulator 120, according to a ninth embodiment of the present invention. The manipulator 120 is combined with three drive mechanisms 122, 124, 126 so as to drive the arm 7 in three dimensions.

Specifically, as for a first drive mechanism 122, one end of a drive rod 2a is fixed to the stationary member 4, and the other end thereof is fixed to a piezoelectric element 1a. The contact body 3a contacts frictionally with the drive rod 2a, so as to move along the drive rod 2a without rotating, when the drive rod 2a vibrates longitudinally by the vibration of the piezoelectric element 1a, as well as the drive mechanism 100 in FIG. 1.

As for a second drive mechanism 124, one end of a drive rod 2b is fixed to the contact body 3a of the first drive mechanism 122, and the other end thereof is fixed to a piezoelectric element 1b. The contact body 3b contacts frictionally with the drive rod 2b, so as to move along the drive rod 2b without rotating, when the drive rod 2b vibrates longitudinally by the vibration of the piezoelectric element 1b.

Similarly, as for a third drive mechanism 126, one end of a drive rod 2c is fixed to the contact body 3b of the second drive mechanism 124, and the other end thereof is fixed to a piezoelectric element 1c. The contact body 3c contacts frictionally with the drive rod 2c, so as to move along the drive rod 2c without rotating, when the drive rod 2c vibrates longitudinally by the vibration of the piezoelectric element 1c. A fixing portion 9 of an arm 7 is fixed to the contact body 3c. The tip portion 8, to which an object (not shown) is fixed, of the arm 7 can rotate relative to the fixing portion 9. Thus, the manipulator 120 can move the object with four degrees of freedom in three-dimensional space. Preferably, neighboring drive rods 2a, 2b; 2b, 2c cross each other at right angles, so that the longitudinal vibration of either one of the drive rod 2a, 2b, 2c exerts no influence on neighboring drive mechanism 122, 124, 126.

As described above, the piezoelectric element is fixed to only the drive rod, and may not be fixed to the other member such as the stationary member. Therefore, no excessive force is exerted on the piezoelectric element. Thereby, it is possible to simplify the construction of the drive mechanism, without considering any construction for protecting the piezoelectric element.

Although the present invention has been fully described in connection with the preferred embodiments thereof with reference to the accompanying drawings, it is to be noted that various changes and modifications are also apparent to those skilled in the art.

For example, there are many variations about fixing of the drive rod, connecting or engaging between the drive rod and the contact body, waveform of drive pulses, timing for supply drive pulses to the piezoelectric elements, and so on.

What is claimed is:

1. A drive mechanism, comprising:
    a stationary member;
    a drive member rigidly affixed to the stationary member in a manner preventing relative movement between the drive member and the stationary member;
    an electromechanical transducer, one portion of which is fixed to the drive member and the other portion of which is freely vibratable; and
    a driven member which is driven by the drive member and which contacts frictionally with the drive member under a predetermined frictional force exerting therebetween, wherein the electromechanical transducer is supplied with drive pulses, so that the electromechanical transducer expands at a first velocity and contracts at a second velocity, different from the first velocity, and so that the driven member moves along the drive member in a predetermined direction.

2. The drive mechanism as claimed in claim 1, wherein expansion and contraction of the electromechanical transducer makes the drive member vibrate, so that a cycle of the vibration of the drive member causes one state in which the driven member slides along the drive member in a predetermined direction, resisting the frictional force exerting therebetween, and another state in which the driven member does not slide along the drive member with the frictional force exerting therebetween.

3. The drive mechanism as claimed in claim 1, wherein the drive member has a pair of ends, so that a portion near one of the ends of the drive member is rigidly affixed to the stationary member, and so that the electromechanical transducer is rigidly affixed to the other of the ends of the drive member.

4. The drive mechanism as claimed in claim 1, wherein the drive member has a pair of ends, so that a portion near one of the ends of the drive member is rigidly affixed to the stationary member, and so that the electromechanical transducer is rigidly affixed to the one of the ends of the drive member.

5. The drive mechanism as claimed in claim 4, wherein another portion near the other of the ends of the drive member is supported by the stationary member.

6. The drive mechanism as claimed in claim 4, wherein another portion near the other of the ends of the drive member is rigidly affixed to the stationary member.

7. The drive mechanism as claimed in claim 1, wherein the stationary member is rigidly affixed to a lens barrel, and wherein the driven member holds a lens.

8. The drive mechanism as claimed in claim 1, wherein the drive member is rigidly affixed to the stationary member by one of caulking, press fitting, fusion bonding, adhesive bonding, screw fastening, and welding.

9. The drive mechanism as claimed in claim 1, wherein the drive member is formed with elastic material.

10. A drive mechanism, comprising:
    a stationary member;
    a drive member having a pair of opposing ends, each of the opposing ends penetrating through a respective opening in the stationary member and being—rigidly affixed to the stationary member at the respective opening in a manner preventing relative movement between the drive member and the stationary member;
    a first electromechanical transducer—rigidly affixed to one of the opposing ends of the drive member that penetrates through one of the respective openings in the stationary member;
    a second electromechanical transducer—rigidly affixed to the other of the opposing ends of the drive member that penetrates through the other of the respective openings in the stationary member; and
    a driven member which is driven by the drive member and which contacts frictionally with the drive member under a predetermined frictional force exerting therebetween, wherein at least one of the first electromechanical transducer and the second electromechanical transducer is supplied with drive pulses, so that the at least one thereof expands at a first velocity and contracts at a second velocity, different from the first velocity, and so that the driven member moves along the drive member in a predetermined direction.

11. The drive mechanism as claimed in claim 10, wherein expansion and contraction of the at least one of the first electromechanical transducer and the second electromechanical transducer makes the drive member vibrate, so that a cycle of the vibration of the drive member causes one state in which the driven member slides along the drive member in a predetermined direction, resisting the frictional force exerting therebetween, and another state in which the driven member does not slide along the drive member with the frictional force exerting therebetween.

12. The drive mechanism as claimed in claim 10, wherein the stationary member is rigidly affixed to a lens barrel, and wherein the driven member holds a lens.

13. The drive mechanism as claimed in claim 10, wherein the drive member is rigidly affixed to the respective openings in the stationary member by one of caulking, press fitting, fusion bonding, adhesive bonding, screw fastening, and welding.

14. The drive mechanism as claimed in claim 10, wherein the drive member is formed with elastic material.

15. A drive mechanism, comprising:
a stationary member;
a first drive member fixed to the stationary member;
a first electromechanical transducer fixed to the fist drive member;
a first driven member which is driven by the first drive member and which contacts frictionally with the first drive member under a predetermined frictional force exerting therebetween;
a second drive member fixed to the first driven member;
a second electromechanical transducer fixed to the second drive member;
a second driven member which is driven by the second drive member and which contacts frictionally with the second drive member under a predetermined frictional force exerting therebetween;
a third drive member fixed to the second driven member;
a third electromechanical transducer fixed to the third drive member;
a third driven member which is driven by the third drive member and which contacts frictionally with the third drive member under a predetermined frictional force exerting therebetween, wherein each of the first electromechanical transducer, the second electromechanical transducer, and the third electromechanical transducer is supplied with drive pulses, so that each thereof expands at a first velocity and contracts at a second velocity, different from the first velocity, respectively, and so that each of the first driven member, the second driven member, and the third driven member moves relative to each of the first drive member, the second drive member, and the third drive member in a predetermined direction, respectively.

16. The drive mechanism as claimed in claim 15, wherein expansion and contraction of each of the first electromechanical transducer, the second electromechanical transducer, and the third electromechanical makes each of the first drive member, the second drive member, and the third drive member vibrate respectively, so that a cycle of the vibration of each thereof causes one state in which each of the first driven member, the second driven member, and the third driven member moves along each of the first drive member, the second drive member, and the third drive member in a predetermined direction, resisting the frictional force exerting therebetween, respectively, and another state in which each of the first driven member, the second driven member, and the third driven member does not move along each of the first drive member, the second drive member, and the third drive member with the frictional force exerting therebetween, respectively.

17. The drive mechanism as claimed in claim 15, wherein the first drive member, the second drive member, and the third drive member are arranged, so that the moving directions of the first driven member, the second driven member, and the third driven member are substantially perpendicular to each other.

* * * * *